July 7, 1953 W. A. AYRES 2,644,382
APPARATUS FOR PRODUCING STEREOSCOPIC PICTURES
Filed Feb. 16, 1949 5 Sheets-Sheet 2

INVENTOR
Waldemar A. Ayres
BY
Curtis, Morris + Safford
ATTORNEYS July 7, 1953  W. A. AYRES  2,644,382
APPARATUS FOR PRODUCING STEREOSCOPIC PICTURES
Filed Feb. 16, 1949  5 Sheets-Sheet 3

INVENTOR
Waldemar A. Ayres
BY
Curtis, Morris + Safford
ATTORNEYS

July 7, 1953  W. A. AYRES  2,644,382
APPARATUS FOR PRODUCING STEREOSCOPIC PICTURES
Filed Feb. 16, 1949  5 Sheets-Sheet 4

INVENTOR
Waldemar A. Ayres
BY
Curtis, Morris + Safford
ATTORNEYS

July 7, 1953   W. A. AYRES   2,644,382
APPARATUS FOR PRODUCING STEREOSCOPIC PICTURES
Filed Feb. 16, 1949   5 Sheets-Sheet 5

INVENTOR
Waldemar A. Ayres
BY
Curtis, Morris + Safford
ATTORNEYS

Patented July 7, 1953

2,644,382

UNITED STATES PATENT OFFICE 2,644,382

APPARATUS FOR PRODUCING STEREOSCOPIC PICTURES

Waldemar A. Ayres, Kew Gardens Hills, N. Y.

Application February 16, 1949, Serial No. 76,784

13 Claims. (Cl. 95—18)

This invention relates to stereoscopic photography, and more particularly to an improved apparatus for producing stereoscopic pictures.

The particular type of stereoscopic picture to which the present invention relates is known as a parallax panoramagram—i. e., one wherein the successive views of different portions of the subject as viewed through a range of positions are recorded in different vertical strip areas on a photo-sensitive film, for example by exposure through screen having optical elements—for example, lenticulations or apertures—which divide the image into spaced line or point images on the film, and the resulting photograph is mounted for viewing through a similar screen so that the two eyes of the observer see the subject as viewed from two different positions, with resulting illusion of depth.

It is among the objects of the present invention to provide such a photograph wherein all portions of the recorded subject matter are presented clearly and without any blurring or "fuzziness," such as occurs when different views of the same portion of the subject are seen through several adjacent optical elements simultaneously. It is also an object to provide such a picture which includes subject matter over great ranges of distance from the camera, without excessive movement of the images of any portion of the subject across the record area of the film.

Another object is the provision of a compact, serviceable and economical camera apparatus for taking such pictures, which apparatus yet affords great flexibility with respect to the manner in which the photograph is taken.

These, and other desirable objects which will be apparent hereinafter, are accomplished by the present invention, suitable embodiments of which are described hereinafter and shown in the accompanying drawings, in which:

Figure 9 is a plan view of the apparatus, showing the camera in various lateral positions;

As is described in my copending application, Serial No. 76,783, in the making of a parallax panoramagram the camera is moved laterally during exposure of the film. Simultaneously, a slit mounted just ahead of the camera lens, or both the slit and the lens, are moved laterally relative to the camera in a direction opposite to the direction of camera movement.

As pointed out in said copending application, the extent of lateral movement of the camera governs the "depth treatment" or effective interocular viewing distance of the panoramagram. Flexibility in the degree of depth treatment accordingly demands variability of the extent of lateral scan of the camera.

The extent of lateral movement of the slit, or slit and lens relative to the camera, is customarily chosen to provide such an extent of lateral movement of the line images on the film within the camera as to expose exactly the entire available record area of the film. The extent of slit movement necessary to accomplish this is dependent upon such factors as the focusing distance of the camera lens, and the lateral spacing and focusing distance of the lenticulations of the screen, factors which are more or less fixed for any given camera and screen. The desired extent of lateral relative movement of the slit or slit and lens must accordingly remain constant, despite changes in the extent of lateral scan of the camera.

For best results, as the camera is moved laterally to different viewing positions, it is simultaneously rotated so that its optical axis is continually directed toward a given point within the field of view known as the "virtual center"— that is, the optical axis is moved radially with respect to the virtual center. During movement of the camera, the image of that portion of the subject at the virtual center remains fixed in position on the lenticulated screen, while images of other portions of the subject move laterally across the screen and the film through a range dependent upon the difference in depth (distance from the camera) of such other portions and the virtual center.

It has been empirically determined that where a screen having 64 lenticulations to the lateral inch is used, if the images of any given portion of the subject are laterally distributed over more than ¾" of the picture, this portion of the subject matter will appear in the mounted photograph as indistinct or "fuzzy," because several images of the same portion of the subject are seen simultaneously through several lenticulations. This limitation is only approximate, being dependent upon such factors as the resolving power of the lenticulations. Where such a screen is used, ¾" is equal to 48 lenticulations; if an 18° viewing angle is permissible, the lenticulations must be capable of completely extinguishing the image in approximately one-third degree of head movement.

In order to prevent excessive movement on the screen and film of any portion of the subject matter, it is accordingly desirable that there be complete latitude in the selection of the "virtual center" of camera movement. The location of the virtual center is, for any given extent of lateral movement of the camera and of the lens, determined by the degree of rotation of the camera during the lateral movement.

Since the extent of lateral movement of distant objects increases as the virtual center of camera movement is moved closer to the camera, and since camera apparatus known heretofore has moved only about centers at short distances from the camera, it has been necessary to select subject matter having a limited range of depth—for example, a range of six feet to considerably less than twenty feet from the camera—in order to prevent excessive movement on the film of the images of the portions of the subject at greatest distance from the virtual center, or, more accurately, from the plane through the virtual center normal to direction of the camera, which plane is known as the "picture plane."

The present invention contemplates the provision of a camera apparatus which is capable of full and independent adjustment of the extent of lateral movement of the camera, of the extent of movement of the slit and lens relative to the camera and of the degree of rotation of the camera. This makes possible the ultilization of subject matter having unlimited range of depth and results in a parallax panoramagram of a type not previously possible.

A camera apparatus capable of the above discussed desirable functions is shown in Figures 1 through 9. This comprises a rectangular base 80, along whose rear edge a track 82—in this instance, a length of round rod—is supported in slightly spaced relation thereabove (see Figure 3) by means of posts 84 at either end of rod 82; several pins 85 (see Figure 7) extend from base 80 into rod 82 at spaced points along rod 82 for the purpose of stiffening the rod.

A camera slide indicated generally at 86, and including an intermediate plate 88, is supported for sliding movement along rod 82 by means of a pair of blocks 90 (Figure 3) secured to the underside of plate 88 and having openings 90a through which rod 82 is received. The forward end of the plate 88 bears upon the upper edge 94a of a flange 94 projecting upwardly from the front edge of base 80. A pair of adjustable stops 95 on rod 82 are provided to limit the lateral movement of the camera slide, the stops being adjusted and held in position on rod 82 by means of knurled screws 95a.

Figure 7:
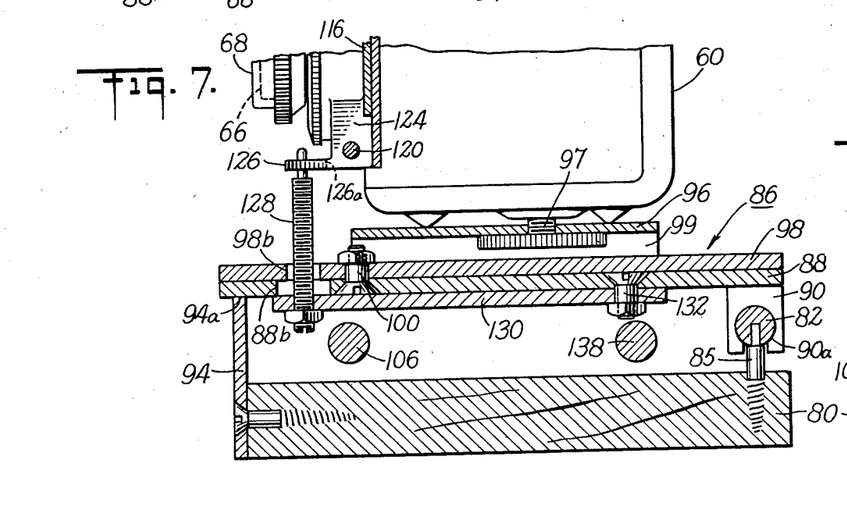

The camera 60 is secured to a supporting plate 96 by conventional means such as a thumbscrew 97 (Figure 7). Plate 96 is in turn supported in spaced relation to an upper plate 98 of the camera slide 86 by means of spacer blocks 99 (Figures 2 and 3) and knurled bolts 101. This arrangement allows easy mounting and dismounting of the camera 60 on the supporting structure.

Upper plate 98 is pivotally secured on intermediate plate 88 by means of a bolt 100 (Figure 7). Plate 98 has a laterally extending arm 98a (Figure 1) from which a block 102 depends and is pivotally supported by means of a bolt 104. This block 102 has a circular opening 102a (Figure 8), through which is slidably received a second track or rod 106. Rod 106 is pivotally supported in slightly spaced relation to base 80 by a pin 108 (see Figure 8). Rod 106 is adjusted and maintained in desired rotational position by means of a pair of locking members 110 and 112 (Figure 1) which engage the opposite ends of rod 106 and which have flanges 110a and 112a, respectively, in which are formed arcuate slots 110a and 112b, respectively, through which locking screws 114 are threaded into base 80.

It will be apparent that if rod 106 is oriented parallel to rod 82, as camera base 86 is moved laterally, intermediate plate 88 and camera 60 will not rotate. However, if, for example, rod 106 is rotated clockwise, as viewed in Figure 1, so that it is not parallel with rod 82, as camera base 86 is moved from left to right, block 102 engages rod 106 at successive points at relatively greater spacing from rod 82, which results in pushing arm 98a forward, and rotating plate 98 and camera 60 in a counter-clockwise direction in the matter illustrated in Figure 9. The degree of inclination of rod 106 relative to rod 82 will determine the degree of rotation of plate 98 and camera 60. Plate 98 is preferably so arranged, as shown, that the pivot (at 100) of plate 98 is directly beneath the camera 60 so that the camera rotates about an axis substantially internal to the camera. Also, preferably the point of engagement between plate 98 and rod 106 (at pivot 104) is some distance from the pivot 100 of plate 908 on the intermediate plate 88, in a direction substantially parallel to the fixed rod 82, to give a substantial moment arm for rotation of the plate 98, and so that the force applied to this moment arm as pivot 104 engages rod 106 at points disposed at successively different distances from rod 82, is in a direction generally perpendicular to the moment arm, for most efficient rotation of plate 98.

Figure 1:
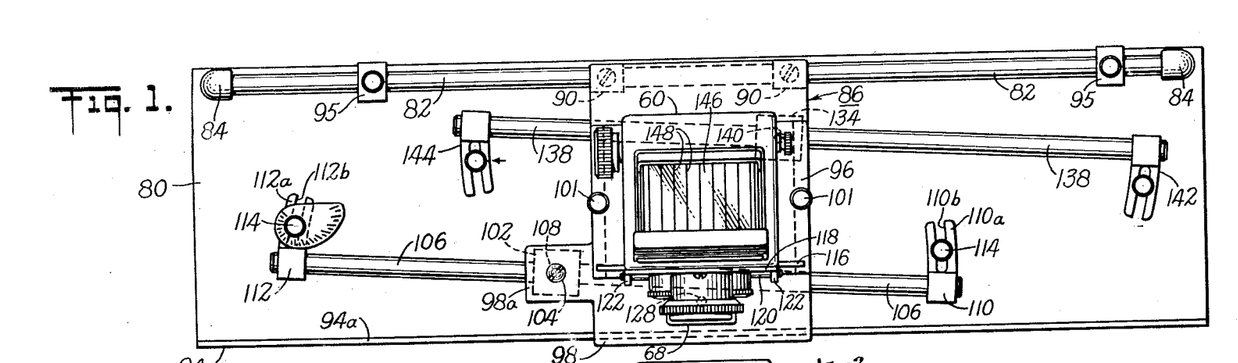
Figures 1 and 2 are respectively plan and front elevational views of a camera apparatus embodying features of the present invention.
Figure 2:
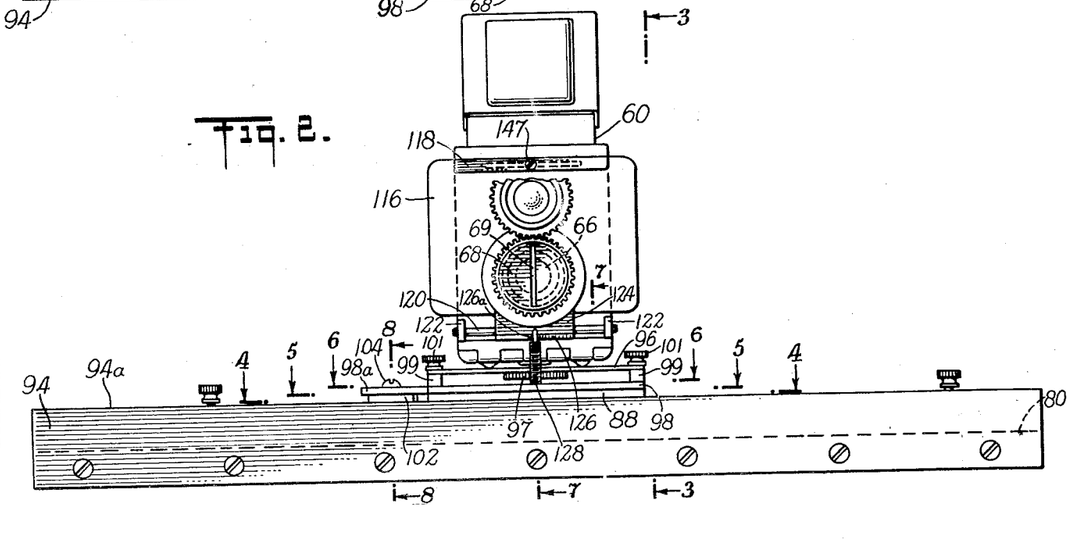
Figure 8:
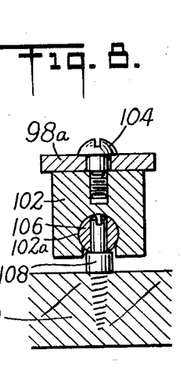

Rod 106 may be most easily adjusted relative to rod 82 by positioning camera base 86 so that the pivot 104 of block 102 is directly above the pivot pin 108 of rod 106 (as is shown in Figures 1 and 8) and loosening locking nuts 114 to allow sliding of the flanges 110a and 112a. Since pivot 104 is directly above the center of rotation of rod 106, the rotation of rod 106 does not produce any movement of plate 98 and camera 60.

A cam 115 (Figure 1) is rotatably mounted under one of the locking nuts 114 with its periphery 115a arranged to cooperate with a portion of the locking member 112. Cam 115 serves as a guide in positioning rod 106 for various degrees of rotation of upper plate 98 and camera 60; it advantageously may be inscribed with a scale of distances to the virtual center of camera movement for the various degrees of rotation effected; this scale is, of course, correct for only one extent of lateral scan of the camera, but the user soon acquires the knack of estimating the variations from the scale required with different extents of lateral scan.

Figure 3:
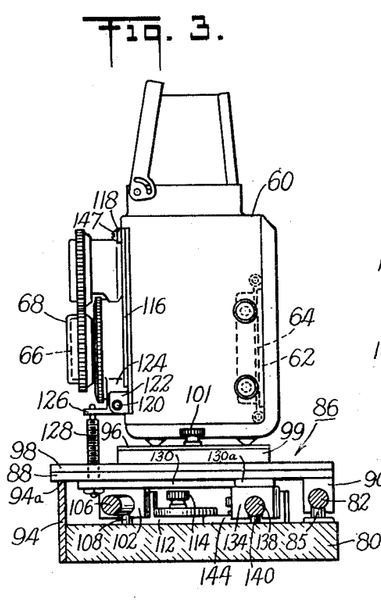
Figures 3, 4, 5, 6, 7 and 8 are respectively sections taken generally along the lines 3—3, 4—4, 5—5, 6—6, 7—7 and 8—8 of Figure 2.
Figure 4:
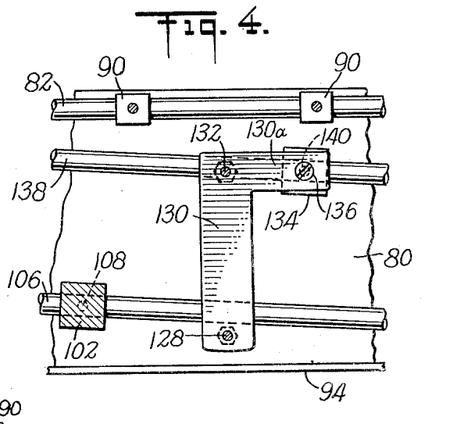
Figure 5:
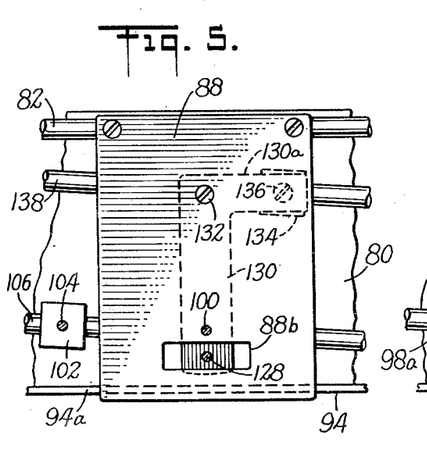
Figure 6:
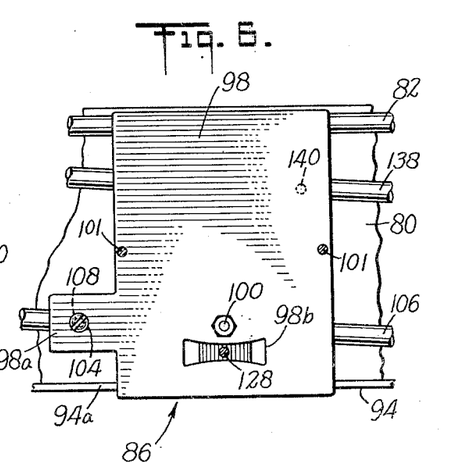

In order to allow movement of the lens 66 relative to the lenticulated screen within the camera, the lens is mounted upon a reciprocable slide 116. This slide is supported on the front face of the camera by means of a clamp 118 engaging the upper edge of slide 116 and a rod 120 secured across the front face of the camera by means of brackets 122, which rod passes through a block 124 secured to the lower end of slide 116. Slide 116 is driven through a bracket 126 (Figure 7) attached to block 124 and projecting forwardly. A notch 126a formed in bracket 126 engages a post 128 extending upwardly from a lower plate or bell crank 130 which is rotatably secured under intermediate plate 88 by means of a bolt 132. Openings 98b and 88b are provided in plates 98 and 88, respectively, to allow relative movement of post 128. A block 134 is rotatably supported on an arm 130a of lower plate 130 by means of a bolt 136. This block engages a third track or rod 138 which is supported in slightly spaced relation to base 80 for pivotal movement about pin 140 (Figures 3 and 4). The rotational position of rod 138 is determined and maintained by means for locking members 142 and 144, similar to the locking members 110 and 114 previously described.

Figure 12:
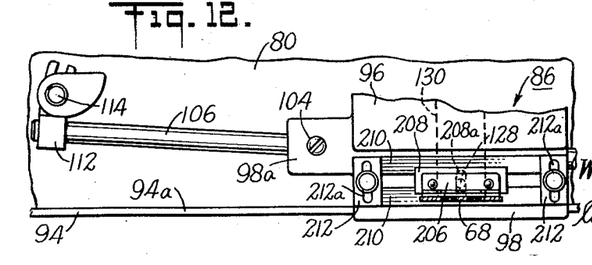
Figure 12 is a section taken generally along line 12—12 of Figure 10.

If, as shown in Figure 9, rod 138 is rotated clockwise relative to rod 82, to such position as is shown in Figure 12, movement of camera slide 86 from left to right (as viewed from the front) will cause a clockwise rotation of lower plate 130 about pivot 132, and a leftward movement of lens 66 relative to the lenticulated screen. The extent of such movement for a given lateral movement of the camera is dependent upon the degree of inclination of rod 138 relative to rod 82.

Rods 106 and 138 are so arranged that the pivots of their respective follower blocks 102 and 134 are both directly above the respective pivots 108 and 140 (Figure 9) of the rods when the camera is in the central position of base 80. At such position, rods 106 and 138 may be adjusted without movement of any parts of the camera slide or camera.

In adjusting the variable controls afforded by the apparatus, it is convenient first to set the stops 95 to permit the desired lateral scan. The rod 138 is then rotated to such position as will afford the desired angular movement of lens 66 relative to the lenticulated screen for the extent of lateral movement previously selected. Next, the rod 106 is adjusted so that, with this lateral scan and angular movement of lens 66, the center of the screen and the center of the lens are lined up with the virtual center of movement throughout the lateral movement of the camera. This is readily accomplished by adjusting the rod 106 so that objects in the picture plane remain in fixed position on the screen. In a reflex camera, such as that illustrated in position on the base, the operator may simply note the position of any object in the picture plane on the ground glass viewing screen 146 of the camera at the central position of the camera on the base, then move the camera to another position and rotate 106 until the object is at the same position as originally noted. Screen 146 is inscribed with a series of lines 148 to aid in ascertaining the lateral position of objects in the image.

A locking screw 147 is provided for securing the lens slide 116 in fixed position, to allow use of the camera for taking ordinary photographs.

Figure 10:
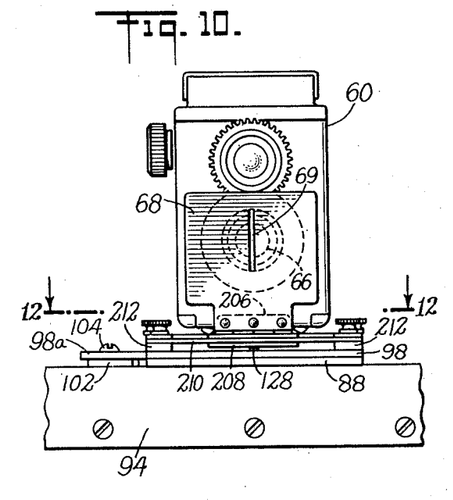
Figures 10 and 11 are respectively front and side framentary elevational views of an alternative form of camera apparatus embodying certain features of the present invention.
Figure 11:
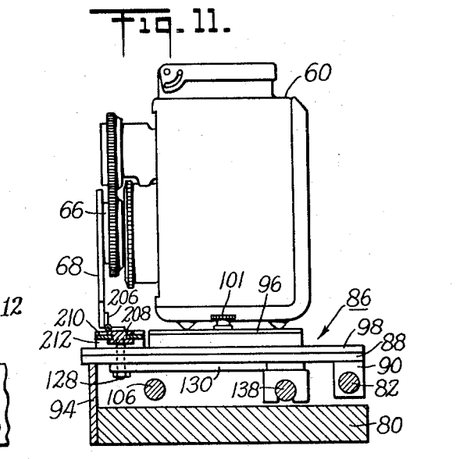

Figures 10, 11 and 12 illustrate an alternative form of camera apparatus wherein the lens 66 remains stationary relative to the camera and only the slit 69 moves relative to the lenticulated screen. This apparatus is identical to that shown in Figures 1 through 9, except in regard to the linkage for driving the slit 69.

The mask 68 in which slit 69 is formed is mounted by means of a hinge 206 on a slide 208 which is supported on ways 210 extending transversely of upper plate 98 and supported in spaced relation thereto by means of spacer blocks 212 at the ends of ways 210. The post 128 which extends upwardly from the forward end of lower plate 130 is received in a slot 208a (see Figure 12) in the under side of slide 208, so that as lower plate 130 is rotated, as hereinabove described, slide 208 and mask 68 will be moved transversely to sweep the slit 69 across the lens 66.

Advantageously, the rod 138 may be adjusted to provide a movement of mask 68 of such extent that, at the extremities of lateral movement of the camera, slit 69 is beyond the aperture of the lens 66, so that mask 68 acts as a shutter for the lens. This facilitates the use of the apparatus by providing automatic synchronization of the exposure of the film with the start and completion of lateral movement of the camera; the camera's regular shutter may be opened (with the shutter set for "bulb" timing) before the lateral movement of the camera is started, and closed after the lateral movement of the camera is completed. Also, as is known in the art, automatic shutter trips may be provided, to open and close the shutter at the desired points in the lateral movement of the camera. The tripping dogs should preferably be adjustable to allow for various extents of lateral scan of the camera.

Slots 210a in the tracks 210 (see Figure 12) provide fore-and-aft adjustment of the track 210 to keep the mask 68 close to the lens while allowing for movement of the lens 66 of the camera for focusing. The hinge 206 allows the mask 68 to be folded down for carrying of the supporting structure independently of the camera.

The embodiment in Figures 10, 11 and 12 possesses the advantage that, since no movement of the lens 66 is necessary, a conventional camera may be used without alteration except for the installation of the lenticulated screen ahead of the focal plane within the camera. The inscription of its ground glass focusing screen 146 with lines 148 is advantageous but not essential; instead of these the location of points in the image can be marked with a glass marking pencil or by bits of pressure sensitive adhesive tape used as a removable pointer.

Figure 13:
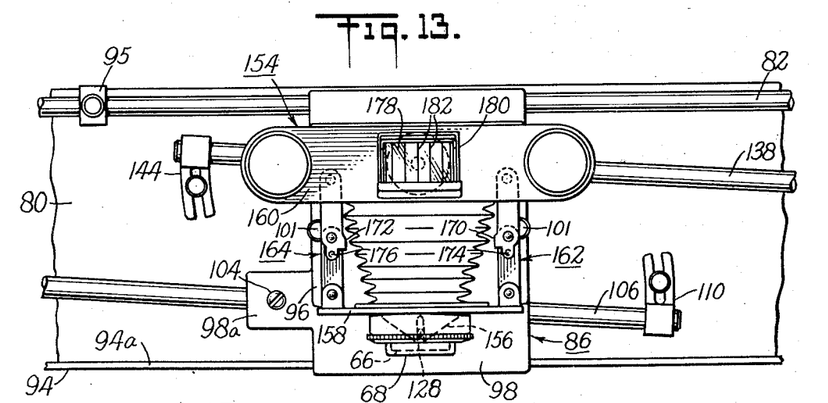
Figure 13 is a plan view of another alternative form of camera apparatus embodying certain features of the present invention.

Figure 13 illustrates an alternative embodiment of photographic apparatus utilizing a bellows-type portable camera indicated generally at 154. This camera is of the type having a lens board 158 supported by folding arms 162 and 164 which, when the camera is in open position, as shown in Figure 13, are held straight by means of stops 170 and 172, and detents 174 and 176, respectively. The arms are pivoted at opposite ends to the camera case and to the lens board and allow a lateral movement of lens board 158 and lens 66 parallel to case 160 and the lenticulated screen therein.

The supporting structure is identical with that shown in the embodiment of Figures 1 through 9. The post 128 projecting upwardly from the lower plate 130 engages a bracket 156 secured to the lower end of the lens board 158 of the camera to move lens board 158 and the lens 66 relative to the lenticulated screen within the camera.

The ground glass screen 178 of the view-finder 180 of the camera is ruled with parallel lines 182 to aid in ascertaining the picture plane, as hereinabove described.

Figure 14:
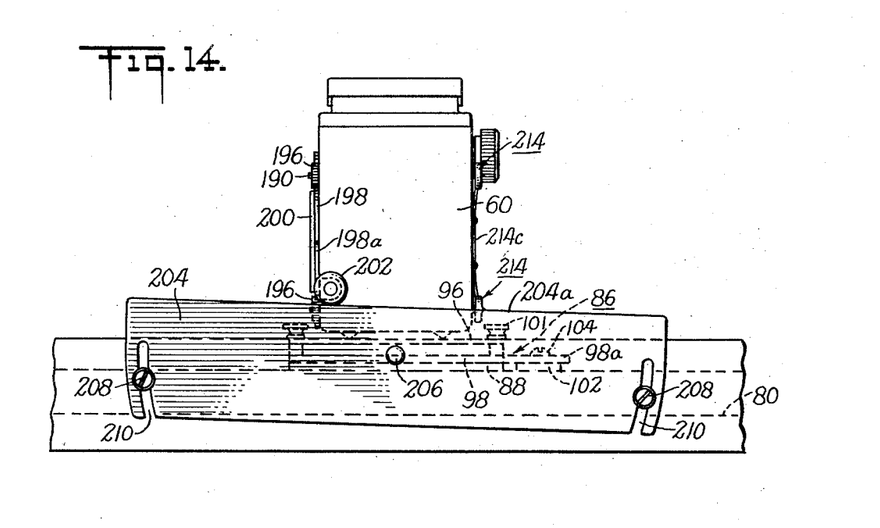
Figures 14 and 15 are respectively rear and side fragmentary elevational views of an alternative form of camera apparatus embodying certain features of the present invention.
Figure 15:
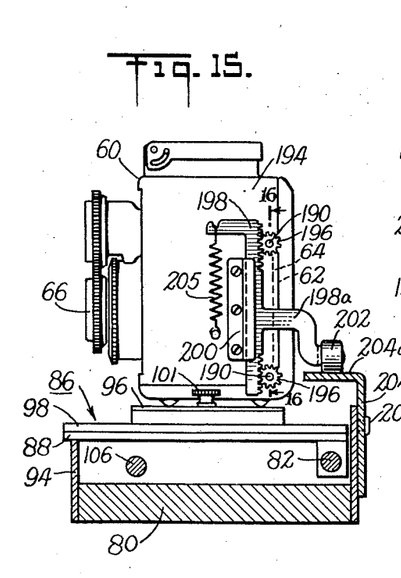
Figure 16:
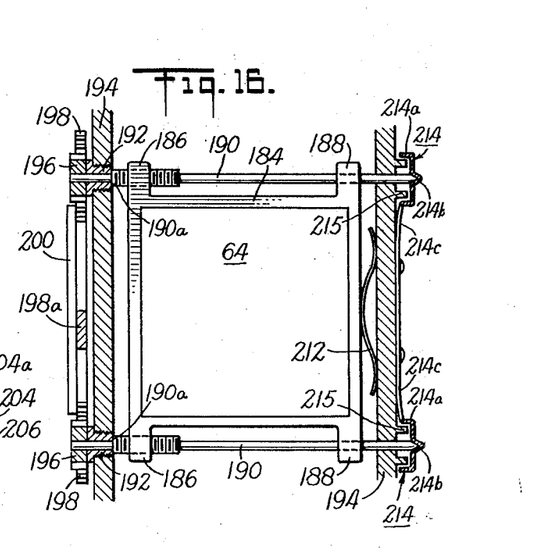
Figure 16 is a section taken generally along the line 16—16 of Figure 15.

In Figures 14, 15 and 16 is shown another embodiment of the apparatus wherein the lateral movement of the line images across the film 62 is achieved by means of lateral movement of the lenticulated screen 64 relative to the film. The lenticulated screen 64 is mounted substantially at the focal plane of the camera in a frame 184, which is supported within the camera by means of bearings 186 and 188. Through these bearings are received a pair of shafts 190, the portion of each of the shafts 190 adjacent bearing 186 being threaded therethrough while the portion of the shafts 190 adjacent bearing 188 is smooth and is slidably received therethrough. Shafts 190 extend through bushings 192 in the case 194 of the camera and on their projecting ends are mounted pinions 196 which engage a rack 198 reciprocally supported outside of the camera by means of a bracket 200. Rack 198 has a rearwardly extending arm 198a at whose free end is supported a follower roller 202 which is urged in cooperation with the upper surface 204a of an angle or cam 204 by means of a spring 205. Cam 204 is pivotally mounted at the rear of the base 80 by means of a pin 206. The rotational position of cam 204 is adjusted and maintained by means of a pair of set screws 208 extending through arcuate slots 210 at opposite ends of cam 204. Cam 204 is normally positioned so that its upper surface 204a is at a slight incline from right to left, as viewed in Figure 14. Accordingly, as the camera slide 86 is moved from right to left (as viewed from the back in Figure 14) during the taking of a photograph, cam follower 202 is pushed slightly upward, raising rack 198 and rotating pinions 196 and shafts 190 slightly to drive frame 184 and the lenticulated screen 64 a short distance relative to the film. Normally, screen 64 is driven a lateral distance equal to the width of one lenticulation—in the particular type of screen described hereinabove, a distance of one sixty-fourth of an inch. Cam 204 may be adjusted to produce this amount of movement of screen 64 for any extent of lateral scan of the camera.

Backlash is prevented between frame 184 and the threaded portions of shaft 190 by means of a leaf spring 212 which exerts a slight pressure between the right hand edge of frame 184, as viewed in Figure 16, and the adjacent wall of the camera case. Shafts 190, in turn, may be maintained in fixed lateral position relative to the camera by means of spring loaded journals 214, each of which comprises a cup portion 214a having a recess 214b formed therein to receive the end of the shaft 190, and is secured to the case of the camera by means of a spring tab 214c. This arrangement exerts a slight leftward pressure on shafts 190, to maintain a shoulder 190a on each shaft 190 seated against the bushing 192. The cup portion 214a forms, with an annular ridge 215 therein, an effective light trap. Alternatively, the right-hand ends of the shafts 190, as viewed in Figure 16, may be journalled in recesses extending only partially through the case 194 of the camera, and the leaf spring 212 alone relied upon for maintaining the shoulders 190a in position against bushings 192.

The camera is rotated during the lateral scan (e. g., by the same angularly adjustable track and associated mechanism 138, 130 as above) to the extent necessary to keep the images of objects in the picture plane motionless on the screen as the camera is moved laterally. Since there is no relative movement of the lens, the movement of the camera is radial about the virtual center. The upper surface 204a of cam 204 is broad enough to allow the resulting arcuate movement of follower 202 thereon.

It will be seen that the camera apparatus described herein is capable of producing stereoscopic pictures according to any of a number of methods, and with diverse types of cameras in common use. Moreover, the supporting structure is extremely compact and portable, being but little longer than the possible scanning width, and but little deeper than the camera to be used.

There will thus be seen to have been provided means whereby the aforesaid and other desirable objects have been achieved. It should be emphasized, however, that the specific embodiments described and shown herein are intended as merely illustrative and in no way restrictive of the invention.

What is claimed is:

1. In a camera for taking stereoscopic photographs, having a case, a film plane within said case, a lens board, a lens on said lens board, and a bellows extending between said lens board and said case, the combination of a screen of vertically oriented optical elements positioned parallel to said film plane and between said film plane and said lens board, and a plurality of arms pivotally attached at one end to said lens board and at the other end to said case and arranged to permit horizontal movement of said lens board relative to said case and parallel to said film plane through a range of lateral positions at least of such extent that the angle subtended at the axis of each of said optical elements by the extremes of movement of the optical axis of said lens is of the same order of magnitude as the angle subtended at the axes of said optical elements by opposite portions of said film plane of the same width as the horizontal spacing of said optical elements.

2. The combination as claimed in claim 1, wherein said arms are jointed for folding said lens board flush to said case.

3. Apparatus for supporting a camera for taking stereoscopic photographs, comprising a base, two tracks on said base positionable at acute angles relative to one another, a carriage assembly engaging one of said tracks for translational movement therealong in a plane parallel to said one track but held against rotational movement in said plane, and a mask-driving bellcrank pivotally mounted on said carriage assembly, one end of said bell-crank engaging the other of said tracks at a distance from the pivotal axis of said mask-driving member in a direction substantially parallel to said one track and the other end having means for engaging, at a point spaced from the pivotal axis of said bellcrank in a direction substantially perpendicular to said one track, an apertured mask associated with the lens of a camera on said carriage assembly, whereby translational movement of said assembly will produce lateral movement of such mask engaging means relative to said assembly to an extent dependent upon the degree of inclination of said tracks relative to one another.

4. Apparatus for supporting a camera for taking stereoscopic photographs, comprising a base, two tracks on said base positionable at acute angles relative to one another, a carriage assembly engaging one of said tracks for translational movement therealong in a plane parallel to said one track but held against rotational movement in said plane, and a mask-driving member pivotally mounted on said carriage assembly, a mask mounted on said carriage assembly for lateral movement relative thereto and operatively connected to said aperture-driving member at a distance from the pivotal axis thereof in a direction having a substantial component perpendicular to said one track and having an aperture so arranged as to be opposite the lens of a camera in position on said carriage assembly, said mask-driving member also engaging the other of said tracks at a distance from said pivotal axis in a direction having a substantial component parallel to said one track, whereby translational movement of said carriage assembly will rotate said mask-driving member about said pivotal axis and produce lateral movement of said carriage aperture relative to said carriage assembly and to said camera to an extent dependent upon the degree of inclination of said tracks relative to one another.

5. Apparatus as claimed in claim 4 wherein said mask is mounted for adjustment along the optical axis of said camera to allow for movement of said lens in focusing.

6. Apparatus for taking stereoscopic photographs comprising a base, two tracks on said base positionable at acute angles relative to one another, a carriage assembly engaging one of said tracks for translational movement therealong in a plane parallel to said one track but held against rotational movement in said plane, a camera on said carriage assembly, said camera having a lens mounting laterally movable relative to said camera, and a lens-driving member pivotally mounted on said carriage assembly and engaging the other of said tracks at a distance from the pivotal axis of said lens-driving member in a direction having a substantial component parallel to said one track and engaging said lens mounting at a point spaced from said pivotal axis in a direction having a substantial component perpendicular to said one track, whereby translational movement of said assembly rotates said lens-driving member and produces lateral movement of said camera and of said lens mounting relative to said camera to an extent dependent upon the degree of inclination of said tracks relative to one another.

7. Apparatus for taking stereoscopic photographs comprising a base, two tracks on said base positionable at acute angles relative to one another, a carriage assembly engaging one of said tracks for translational movement therealong in a plane parallel to said one track but held against rotational movement in said plane, a camera on said carriage assembly, said camera having a lens mounting laterally movable relative to said camera, and a lens on said lens mounting, a mask on said lens mounting having an aperture opposite said lens, and a lens-driving member pivotally mounted on said carriage assembly and engaging the other of said tracks at a distance from the pivotal axis of said lens-driving member in a direction having a substantial component parallel to said one track and engaging said lens mounting at a distance from said pivotal axis in a direction having a substantial component track, whereby translational movement of said assembly produces lateral movement of said camera and of said lens and said aperture relative to said camera to an extent dependent upon the degree of inclination of said tracks relative to one another.

8. Apparatus for supporting a camera for taking stereoscopic photographs comprising a base, three tracks on said base, two of said tracks being positionable at acute angles relative to the other, a carriage member engaging the latter said track for translational movement therealong in a plane parallel thereto, but held against rotational movement in said plane, a camera support member pivotally mounted on said carriage member and engaging one of the first said tracks at a distance from the pivotal axis of said camera support member in a direction having a substantial component parallel to said latter track, and a mask-driving member pivotally mounted on said carriage member and engaging the other of the first said tracks at a distance from the pivotal axis of said mask-driving member in a direction having a substantial component parallel to said latter track and having at a distance from the pivotal axis of said mask-driving member in a direction having a substantial component perpendicular to said latter track means positioned for operative driving connection with a movable apertured mask, whereby translational movement of said members produces rotation of said camera support member, and movement of such engaging means relative to an adjacent portion of said camera support member to extents respectively dependent upon the degrees of inclination of the two first said tracks relative to said latter track.

9. Apparatus for supporting a camera for taking stereoscopic photographs comprising a base, three tracks on said base, two of said tracks being positionable at acute angles relative to the other, a carriage member engaging the latter said track for translational movement therealong in a plane parallel thereto, but held against rotational movement in said plane, a camera support member pivotally mounted on said carriage member and engaging one of the first said tracks at a distance from the pivotal axis of said camera support member in a direction parallel to said latter track, an apertured mask supported on said camera support member for lateral movement relative thereto, and a mask-driving member movably mounted on said carriage member and mechanically linking said mask with the other of said two tracks whereby translational movement of said members produces rotation of said camera support member and lateral movement of said aperture relative thereto to extents respectively dependent upon the degrees of inclination of the two first said tracks relative to said latter track.

10. Apparatus for taking stereoscopic photographs comprising a base, three tracks on said base, two of said tracks being positionable at acute angles relative to the other, a carriage member supported on said base and engaging the latter said track for translational movement therealong in a plane parallel thereto but held against rotational movement in said plane, a camera support member pivotally mounted on said carriage member and engaging one of the first said tracks at a distance from the pivotal axis of said camera support member in a direction parallel to the latter said track, a camera on said camera support member, a mask having an aperture opposite the lens of said camera, and a mask-driving member pivotally mounted on said carriage member and mechanically linking said mask with the other of the first said tracks, whereby translational movement of said members produces rotation of said camera and lateral movement of said aperture relative to said camera to extents respectively dependent upon the degrees of inclination of the two first said tracks relative to the latter said track.

11. Apparatus for taking stereoscopic pictures comprising a base, two tracks on said base positionable at acute angles relative to one another, a carriage assembly adapted to support a camera, said carriage assembly engaging one of said tracks for translational movement therealong in a plane parallel to said one track but held against rotational movement in said plane, a mask engaging element positioned for operative driving connection with an apertured mask in front of a camera on said carriage assembly, mechanical linkage means connected at a first point to the other of said tracks and at a second point to said mask engaging element for converting a component of movement at said first point perpendicular to said one track into a component of movement at said second point parallel to said one track, whereby translational movement of said carriage assembly along said tracks will produce movement of said mask engaging element relative to said carriage assembly in a direction having a component parallel to said one track and to an extent dependent upon the degree of inclination of said tracks relative to each other.

12. Apparatus for taking stereoscopic pictures comprising a base, two tracks on said base positionable at acute angles relative to one another, a carriage assembly adapted to support a camera, said carriage assembly engaging one of said tracks for translational movement therealong in a plane parallel to said one track but held against rotational movement in said plane, a mask mounted on said carriage assembly for lateral movement relative thereto and having an aperture so arranged as to be opposite the lens of a camera in position on said carriage assembly, mechanical linkage means connected at a first point to the other of said tracks and at a second point to said mask for converting a component of movement at said first point perpendicular to said one track into a component of movement at said second point parallel to said one track, whereby translational movement of said carriage assembly along said tracks will produce movement of said mask relative to said carriage assembly in a direction having a component parallel to said one track and to an extent dependent upon the degree of inclination of said tracks relative to each other.

13. Apparatus for taking stereoscopic photographs comprising a base, three tracks on said base, two of said tracks being positionable at acute angles relative to the other, a carriage assembly supported on said base and engaging the latter said track for translational movement therealong in a plane parallel thereto but held against rotational movement in said plane, a camera support member pivotally mounted on said carriage assembly and engaging one of the first said tracks at a distance from the pivotal axis of said camera support member in a direction parallel to the latter said track, a camera on said camera support member, a screen of optical elements mounted within said camera, a follower member mounted on said carriage assembly for engagement with the other of the first said tracks and for movement relative to said camera carriage assembly in a direction having a substantial component perpendicular to the latter said track, and mechanical linkage means interconnecting said follower member and said screen for converting the aforesaid movement of said follower member into lateral movement of said screen relative to said camera, whereby translational movement of said carriage assembly along said tracks will produce rotation of said camera and lateral movement of said screen within said camera to extents respectively dependent upon the degrees of inclination of the two first said tracks relative to the latter said track.

WALDEMAR A. AYRES.

References Cited in the file of this patent

UNITED STATES PATENTS

| Number | Name | Date |
|---|---|---|
| 715,125 | Niss | Dec. 2, 1902 |
| 1,819,844 | Ross | Aug. 18, 1931 |
| 1,892,683 | Robertson | Jan. 13, 1933 |
| 1,916,320 | Ives | July 4, 1933 |
| 1,918,705 | Ives | July 18, 1933 |
| 2,096,496 | Huntzinger | Oct. 19, 1937 |
| 2,139,855 | St. Genies | Dec. 13, 1939 |
| 2,150,932 | McDonnell | Mar. 21, 1939 |
| 2,158,660 | Kanolt | May 16, 1939 |
| 2,165,346 | Crumrine | July 11, 1939 |
| 2,170,583 | Thompson | Aug. 22, 1939 |
| 2,175,114 | Friedmann | Oct. 3, 1939 |
| 2,336,331 | Wittel | Dec. 7, 1943 |
| 2,400,455 | Donaldson | May 14, 1946 |
| 2,485,811 | Bonnet | Oct. 25, 1949 |
| 2,495,355 | Stahl | Jan. 24, 1950 |
| 2,508,487 | Bonnet | May 23, 1950 |

FOREIGN PATENTS

| Number | Country | Date |
|---|---|---|
| 590,853 | France | Mar. 26, 1925 |